(12) United States Patent
Ohlsson et al.

(10) Patent No.: US 6,278,411 B1
(45) Date of Patent: Aug. 21, 2001

(54) HORN ANTENNA

(75) Inventors: Magnus Ohlsson, Norsholm; Carina Marcus; Håkan Fredriksson, both of Linköping, all of (SE)

(73) Assignee: Saab Marine Electronics AB, Göteborg (SE)

( * ) Notice: Subject to any disclaimer, the term of this patent is extended or adjusted under 35 U.S.C. 154(b) by 0 days.

(21) Appl. No.: 09/445,770
(22) PCT Filed: May 7, 1998
(86) PCT No.: PCT/SE98/00834
§ 371 Date: Dec. 13, 1999
§ 102(e) Date: Dec. 13, 1999
(87) PCT Pub. No.: WO98/57392
PCT Pub. Date: Dec. 17, 1998

(30) Foreign Application Priority Data

Jun. 11, 1997 (SE) .................................................. 9702235

(51) Int. Cl.$^7$ .................................................. H01Q 13/00
(52) U.S. Cl. .............................................. 343/772; 343/786
(58) Field of Search ..................................... 343/786, 772, 343/783, 784, 785

(56) References Cited

U.S. PATENT DOCUMENTS

| | | | |
|---|---|---|---|
| 3,605,101 | * 9/1971 | Kolettis et al. | 343/783 |
| 5,017,937 | * 5/1991 | Newham et al. | 343/785 |
| 5,495,218 | * 2/1996 | Erb et al. | 333/248 |
| 5,594,449 | 1/1997 | Otto | 342/124 |
| 5,642,121 | * 6/1997 | Martek et al. | 343/786 |
| 5,926,080 | * 7/1999 | Palan et al. | 333/252 |

FOREIGN PATENT DOCUMENTS 0 162 821    11/1985   (EP) ................................. G01F/23/28

\* cited by examiner

Primary Examiner—Tho Phan
Assistant Examiner—Hoang Nguyen
(74) Attorney, Agent, or Firm—Swidler Berlin Shereff Friedman, LLP

(57) ABSTRACT

A horn antenna for transmitting microwaves. A conical horn includes a small opening and a large opening. A transition piece includes a tapering portion and a non-tapering portion. The transition piece is arranged in the conical horn between a waveguide and an environment that the horn antenna is arranged in. A transition between the tapering portion and the non-tapering portion is arranged between the small opening and the large opening of the conical horn. The non-tapering portion engages the small opening of the conical horn.

14 Claims, 1 Drawing Sheet

HORN ANTENNA

FIELD OF THE INVENTION

The invention concerns a horn antenna for the directional transmission of microwaves, where the antenna is constructed in such a way that its operation is not affected by condensation, derived from a fluid, which has accumulated on the antenna.

BACKGROUND OF THE INVENTION

Horn antennas for the transmission of microwaves are used in technology, for example, to measure the level of a fluid in a tank. In the case of this example such a device is normally positioned close to the roof of the tank. A wave guide for the transmission of microwaves to and from the antenna is connected to the antenna via an opening in the roof of the tank. In order to achieve a sealed boundary between the atmosphere prevailing in the chamber where the antenna is placed and the wave guide of the antenna, the antenna is generally equipped with a sealing transitional piece between the wave guide and the antenna horn. So as to produce a gentle transition this transition, piece is normally made of teflon and conical in shape. However, the transition piece can have other shapes, for example, a spherical knob, a plane surface or even a cone-like part constructed by a stack-like arrangement of cylindrical bodies with progressively diminishing diameter. On account of its chemical stability, teflon is the preferred material for this part, although other materials may be used.

When deciding on the shape of the transition piece it became apparent that this property has an influence on the antenna's ability to tolerate accumulation of fluid on the surface of the antenna by, for example, condensation. Particularly vulnerable is the circular trench that exists between the transition piece, for example the cone, and the horn. Fluid can easily accumulate here as a result of capillary action. Since certain fluids, for example water, have a high dielectric constant, an accumulation of fluid around, for example, a conical transition piece could be interpreted, by the microwaves transmitted by the antenna, as a restriction. This is because the diameter of the wave guide is perceived as reduced if fluid has ascended on to the envelope surface of the cone.

In this way the ability of the microwaves to propagate normally between the wave guide and the environment is impeded.

Similarly, problems caused by condensation on the transition piece occur if this part has a different shape. For instance, if the transition piece is planar the accumulated moisture on this surface produces a more or less indefinable wave guide diameter at this plane. Moreover, if the shape of the transition piece was such that it tapered in a stepwise fashion towards the antenna chamber then, even in this case the problem of moisture accumulations would arise in each individual step, which in turn would tend to produce restriction of the microwave. Owing to these difficulties, a conical transition piece is the most commonly occurring design within this technical field.

A transition piece, in the shape of a cone, from the wave guide to the chamber where the antenna is located is, according to current models within microwave technology, designed so that the base of the cone is at approximately the same level as the level where the cross-sectional area of the horn antenna's cone begins to decrease, i.e. at the horn's narrowest part. Following from this commonly adopted design, it has been found that condensed fluid accumulates in the aforementioned trench, between the horn and the transition piece, in an antenna that is used, for example, in the way mentioned above, i.e. in a tank in which a fluid is contained. The atmosphere in the tank is saturated, for example during boiling. Furthermore, the temperature of the antenna is lower than that of its environment The effect of such circumstances is that fluid in the tank condenses and falls on the antenna, causing the restriction in the trench that is present in the antenna, the result of which is that the transmission of the microwaves is disturbed. Generally speaking, condensed moisture invariably appears on antennas of the type described here in vapor-saturated tank environments; hence the problem of disturbed transmission is a recurring phenomena.

The invention presented here provides a solution to the problem outlined above.

SUMMARY OF THE INVENTION

According to one aspect of the invention a horn antenna for transmission of microwaves is presented. The horn antenna includes a conical horn for directional transmission and reception of microwaves. At the center of narrowest part of the horn, a transition piece separating a wave guide from the environment is positioned. The transition piece is tapered and is characterized by its tapering part being arranged so as to operate outside a normally fluid-filled circular trench between the horn and the transition piece.

The transition piece is preferably designed as a radially symmetrical body, of which its inner part is cylindrical, whereas its outer part is conical or cone-like, and thus tapering in the direction of the environment.

The cylindrical part of the transition piece constitutes a part extended into the horn. Between the cylindrical part of the transition piece and the horn is the previously mentioned trench, where fluid accumulates as a result of condensation. In the case of a downward facing antenna with the horn and the transition piece directed downwards, it is thus possible to predict the length of the cylindrical part so that the fluid draining from the trench is unable to be retained by capillary action. In this way the length of the cylindrical part can be determined so that the remaining fluid in the trench does not appear further out on the transition piece, where it tapers off.

An advantage of such a design for the transition piece is that the fluid present in the trench exists only along the transition piece's uniform thickness. Owing to the fluid's normally relatively high dielectric constant, the accumulated fluid is interpreted by the microwaves transmitted through the transition piece as part of the wave guide. Consequently, the wave guide diameter is not affected by the fluid accumulation, which in turn means that use of the horn antenna is independent of the presence of fluid in the trench. The design of the transition piece does not prevent the accumulation of fluid in the space, i.e. the trench between horn and transition piece. Nevertheless, consideration has been taken of the fact that fluid is normally present during employment of the antenna and that the antenna is designed accordingly.

DETAILED DESCRIPTION OF THE INVENTION

The invention is described below with the aid of the attached figures.

Figure 1:
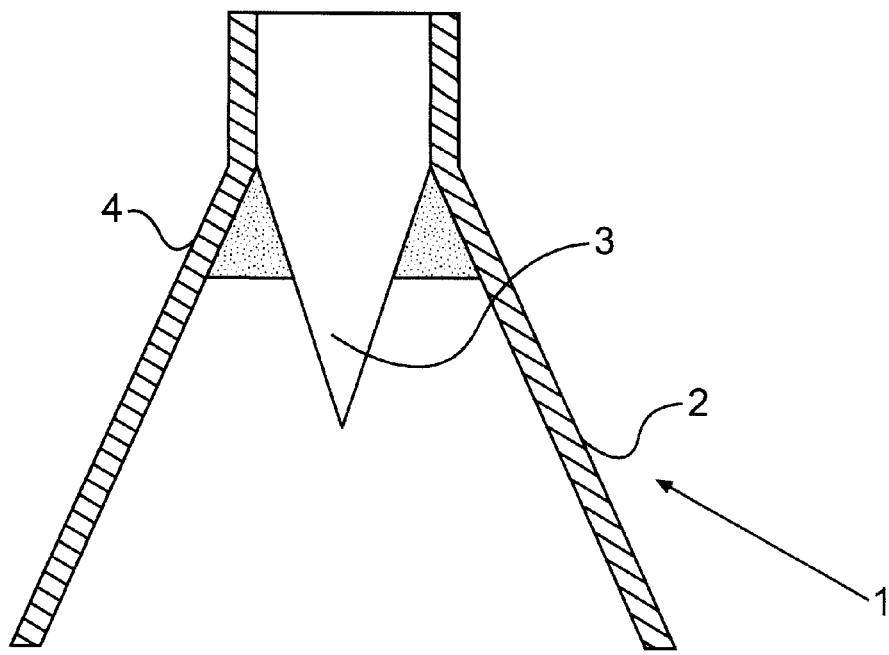
FIG. 1 illustrates a conventionally designed horn antenna

In FIG. 1 a horn antenna 1 of conventional type, used for example to gauge the level of a fluid in tanks, is shown. The antenna here is assembled according to the figure. i.e. with the conical horn 2 facing downwards. A wave guide, omitted from the figure, is attached to the horn antenna 1 with a transition piece 3 arranged at the connection of the wave guide to the antenna. The transition piece 3 is inserted in and seals an opening at the narrowest part of the horn 2. The conventionally arranged transition piece 3 is designed so that it tapers towards the outer part of the horn 2, usually in the shape of a circular cone. The transition piece 3 is, as mentioned previously, preferably made of teflon, one role of which is to act as a seal between the wave guide and the outer environment. FIG. 1 also shows a fluid-filled space 4, between the horn 2 and the transition piece 3, in a circular trench occurring between these components. Since the fluid-filled space 4, which in most cases is filled with condensed water, projects a small distance out onto the envelope surface of the conical part of the transition piece, a microwave transmitted through the transition piece interprets the fluid as a restriction, or even a "cut-off", caused by the fluid reducing the available wave guide diameter of the transition piece 3.

Figure 2:
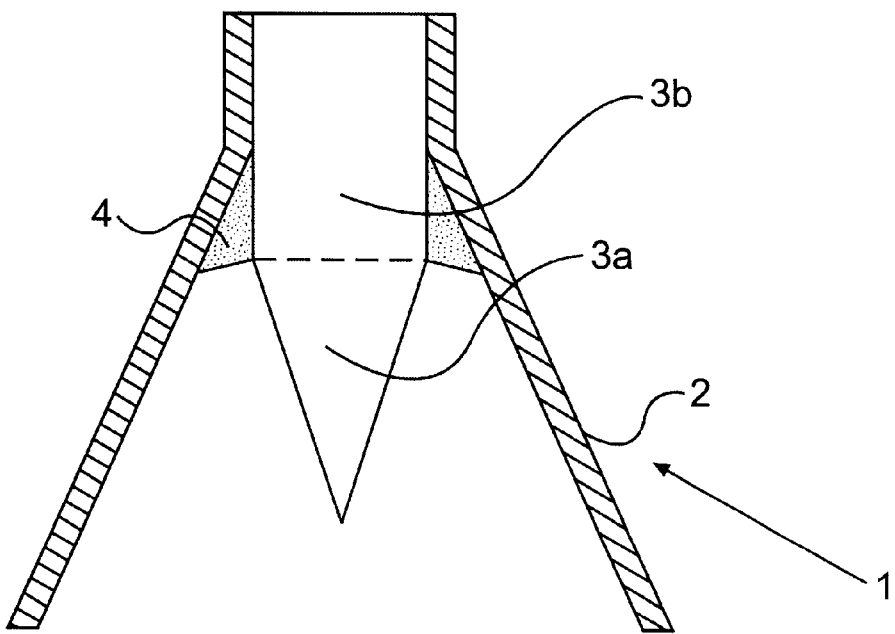
FIG. 2 illustrates a horn antenna designed to incorporate the invention described here.

A design based on the invention is presented in FIG. 2. It can be seen that the cylindrical part of the transition piece 3 is constricted so that it penetrates the horn a distance which is predetermined to be equal to the depth of the circular trench between the horn 2 and the transition piece 3, which is normally filled with condensed fluid, usually water. By adopting this design the conical part 3a of the transition piece 3 will have its base, i.e. its broadest part, at approximately the level where the fluid-filled space 4 has its external limits. Thus, the fluid in the space 4 will not expose a wave transmitted through the transitionpiece to restriction, since the wave guide diameter of the transition piece is not significantly affected by fluid in the space 4.

Moreover, the design according to the invention is self-regulating, since additionally condensed fluid drawn to the space 4 will run off, since capillary action and surface tension will not be capable of retaining a larger volume of fluid than that contained in the space 4. Furthermore, its operation is not disrupted by the absence of fluid in the space 4, since this does not influence the wave guide diameter in any significant way.

In the above example both the wave guide and the transition piece are assumed to be circular in cross-section. There is, however, nothing preventing other cross-sections from being used, for instance, a rectangular wave guide cross-section, which in turn requires that the conical part 3a of the transition piece is pyramidal.

What is claimed is:

1. A horn antenna for transmitting microwaves, comprising:
   a conical horn comprising a small opening and a large opening; and
   a transition piece comprising a tapering portion and a non-tapering portion, the transition piece being arranged in the conical horn between a waveguide and an environment that the horn antenna is arranged in, a transition between the tapering portion and the non-tapering portion being arranged between the small opening and the large opening of the conical horn, and the non-tapering portion engaging the small opening of the conical horn.

2. The horn antenna according to claim 1, wherein the transition between the tapering portion and the non-tapering portion of the transition piece portion lies outside a maximum level of liquid that in a space defined by the transition piece and the conical horn can be retained by capillary action and surface tension.

3. The horn antenna according to claim 1, wherein the transition between the tapering portion and the non-tapering portion of the transition piece portion lies at a maximum level of liquid that in a space defined by the transition piece and the conical horn can be retained by capillary action and surface tension.

4. The horn antenna according to claim 1, wherein the transition piece is radially symmetrical.

5. The horn antenna according to claim 1, wherein the tapering portion of the transition piece is conical and the tapering portion of the transition piece is cylindrical.

6. The horn antenna according to claim 1, wherein the tapering portion of the transition piece is pyramidal and the tapering portion of the transition piece is rectangular.

7. A horn antenna for transmitting microwaves, comprising:
   a conical horn; and
   a transition piece comprising a tapering portion and a non-tapering portion, the transition piece being arranged in the conical horn such that the tapering portion lies outside a maximum level of liquid that in a space defined by the transition piece and the conical horn can be retained by capillary action and surface tension.

8. The horn antenna according to claim 7, wherein the transition piece is radially symmetrical.

9. The horn antenna according to claim 7, wherein the tapering portion of the transition piece is conical and the tapering portion of the transition piece is cylindrical.

10. The horn antenna according to claim 7, wherein the tapering portion of the transition piece is pyramidal and the tapering portion of the transition piece is rectangular.

11. A horn antenna for transmitting microwaves, comprising:
    a conical horn; and
    a transition piece comprising a tapering portion and a non-tapering portion, the transition piece being arranged in the conical horn such that the tapering portion lies at a maximum level of liquid that in a space defined by the transition piece and the conical horn can be retained by capillary action and surface tension.

12. The horn antenna according to claim 11, wherein the transition piece is radially symmetrical.

13. The horn antenna according to claim 11, wherein the tapering portion of the transition piece is conical and the tapering portion of the transition piece is cylindrical.

14. The horn antenna according to claim 11, wherein the tapering portion of the transition piece is pyramidal and the tapering portion of the transition piece is rectangular.

* * * * *